(12) United States Patent
Liu et al.

(10) Patent No.: US 11,859,672 B2
(45) Date of Patent: Jan. 2, 2024

(54) HOSE QUICK CONNECTION DEVICE FOR FRACTURING EQUIPMENT

(71) Applicant: YANTAI JEREH PETROLEUM EQUIPMENT & TECHNOLOGIES CO., LTD., Yantai Shandong (CN)

(72) Inventors: Youcang Liu, Yantai Shandong (CN); Yuanliang Liu, Yantai Shandong (CN); Chonggang Jiang, Yantai Shandong (CN); Liang Li, Yantai Shandong (CN); Wenming Zhang, Yantai Shandong (CN)

(73) Assignee: YANTAI JEREH PETROLEUM EQUIPMENT & TECHNOLOGIES CO., LTD., Yantai Shandong (CN)

( * ) Notice: Subject to any disclaimer, the term of this patent is extended or adjusted under 35 U.S.C. 154(b) by 395 days.

(21) Appl. No.: 17/170,130

(22) Filed: Feb. 8, 2021

(65) Prior Publication Data
US 2022/0154775 A1 May 19, 2022

(30) Foreign Application Priority Data
Nov. 17, 2020 (CN) .......................... 202022665067.0

(51) Int. Cl.
*F16D 1/10* (2006.01)
*E21B 43/26* (2006.01)

(52) U.S. Cl.
CPC ................ *F16D 1/10* (2013.01); *E21B 43/26* (2013.01)

(58) Field of Classification Search
CPC ......... F16D 1/10; E21B 43/26; E21B 43/2607
See application file for complete search history.

(56) References Cited

U.S. PATENT DOCUMENTS

| 4,474,213 A | * | 10/1984 | Jameson | ............. E21B 43/2607 |
| | | | | 137/899.3 |
| 5,661,888 A | * | 9/1997 | Hanslik | ................... B23P 19/10 |
| | | | | 29/714 |

(Continued)

FOREIGN PATENT DOCUMENTS

| CN | 205876289 U | 1/2017 |
| CN | 109025944 A | 12/2018 |

(Continued)

OTHER PUBLICATIONS

International Search Report dated Jul. 26, 2021, for International Application No. PCT/CN2020/136908, 5 pages.

*Primary Examiner* — James G Sayre
(74) *Attorney, Agent, or Firm* — FROST BROWN TODD LLP

(57) ABSTRACT

The present disclosure relates to a hose quick connection device for a fracturing equipment, comprising: a hose holding and moving mechanism for holding a hose and moving the hose between an initial position and a target position, wherein at the target position, an end of the hose is aligned with a manifold interface; and a controller configured to: receive first orientation information indicating the orientation of the hose from the first sensing device and receive second orientation information indicating the orientation of the manifold interface from the second sensing device; generate a desired motion command for moving the hose to the target position, based on the first orientation information and the second orientation information; and control the hose holding and moving mechanism to execute the desired motion command to move the hose to the target position. The present disclosure further relates to a fracturing equipment comprising the hose quick connection device.

13 Claims, 3 Drawing Sheets

(56) References Cited

U.S. PATENT DOCUMENTS

| | | | |
|---|---|---|---|
| 10,227,859 B2* | 3/2019 | Richards | E21B 41/00 |
| 2019/0302810 A1* | 10/2019 | Kibler | G05D 3/125 |
| 2020/0115983 A1* | 4/2020 | Nanney | E21B 43/2607 |
| 2020/0131877 A1* | 4/2020 | Guidry | E21B 33/068 |
| 2021/0062617 A1* | 3/2021 | Pillai | E21B 34/02 |
| 2021/0131247 A1* | 5/2021 | Ungchusri | E21B 43/26 |
| 2021/0372548 A1* | 12/2021 | Post | E21B 43/26 |

FOREIGN PATENT DOCUMENTS

| | | |
|---|---|---|
| CN | 210440005 U | 5/2020 |
| CN | 210712713 U | 6/2020 |
| CN | 210858684 U | 6/2020 |
| WO | WO 2000/066925 A1 | 11/2000 |

* cited by examiner

HOSE QUICK CONNECTION DEVICE FOR FRACTURING EQUIPMENT

FIELD

The present disclosure relates to a hose quick connection device for fracturing equipment used in oil and gas field fracturing and a fracturing equipment with such a hose quick connection device.

BACKGROUND

When a fracturing equipment is operating in oil and gas field exploitation, high-pressure fracturing fluid pumped out by the fracturing equipment needs to be delivered to a manifold skid, and then to be delivered downhole through the manifold skid. In the past, the fracturing equipment is connected to the manifold skid via a hard pipe. Upon connection, at least 4 connection joints are required to complete the manifold connection. For each of the connection joints, workers need to move an extremely heavy high-pressure elbow or straight pipe on site and complete the connection by striking a union joint. As one manifold skid needs to be connected to a plurality of fracturing trucks during field operations, the workload of connecting the high-pressure manifold is really huge, time-consuming and labor-intensive, and the connection process is extremely inconvenient with great safety risks. In addition, the cost of high-pressure hard pipe is relatively high.

In order to solve the problem that the high-pressure hard pipe is bulky and high-cost, currently the manifold skid is connected to each fracturing equipment mostly via a high-pressure hose. Since the high-pressure hose may be made longer, a high pressure discharge port of the fracturing equipment can be connected to the manifold skid by using only one high-pressure hose to connect two joints. Furthermore, the high-pressure hose has advantages including the capability of reducing fluid vibration, longer service life, more affordable price, faster flow rate compared with traditional high-pressure hard pipes, as well as more compact structure benefiting from bendability of the hose. For these reasons, the high-pressure hose has been widely used in well sites. However, although the high-pressure hose has many advantages over hard pipes, when connected on site, at least 3 meters of high-pressure hose still needs to be used to duly connect each fracturing equipment to the manifold skid. The 3-meter high-pressure hose weighs up to over 100 kg, and at least three workers are still required to lift and pull the high-pressure hose in order to connect the manifold on site, which is also extremely inconvenient and unsafe In view of this, it is desirable to propose a high-pressure hose quick connection device to solve the foregoing problems.

SUMMARY

In one aspect, the present disclosure provides a hose quick connection device for a fracturing equipment. The hose quick connection device comprises: a hose holding and moving mechanism for holding and moving a hose between an initial position and a target position, wherein the initial position is a position in which the fracturing equipment is initially positioned with respect to a manifold, and the target position is a position in which a free end of the hose is aligned with a manifold interface; a first sensing device disposed on the free end of the hose; a second sensing device disposed at the manifold interface; and a controller configured to: receive first orientation information indicating the orientation of the free end from the first sensing device and second orientation information indicating the orientation of the manifold interface from the second sensing device; generate a desired motion command for moving the free end of the hose to the target position, based on the first orientation information and the second orientation information; and control the hose holding and moving mechanism to execute the desired motion command to move the hose to the target position.

According to one embodiment, the controller is configured to transmit the desired motion command to an actuation mechanism which is configured to control the hose holding and moving mechanism to move the free end of the hose to the target position based on the desired motion command.

According to one embodiment, the hose holding and moving mechanism comprises: a base; a fixed rod extending from the base and configured to rotate relative to the base; a first arm pivotally connected to the fixed rod; and a second arm pivotally connected to the first arm, wherein the hose is releasably held to the first arm and the second arm. Preferably, the base is disposed on the fracturing equipment. Preferably, the hose is releasably held to the first arm and the second arm by a hose clamp.

According to one embodiment, the actuation mechanism is a hydraulic mechanism comprising a hydraulic motor disposed in the base, a first hydraulic cylinder disposed between the fixed rod and the first arm, and a second hydraulic cylinder disposed between the first arm and the second arm.

According to one embodiment, the actuation mechanism is an electric mechanism comprising an electric motor disposed in the base, a first servo motor disposed between the fixed rod and the first arm, and a second servo motor disposed between the first arm and the second arm.

Preferably, an opposite end of the hose is fixedly or releasably connected to the fracturing equipment, such as a fracturing truck, to receive fracturing fluid.

Preferably, the fracturing equipment has a fracturing equipment controller integrated into the fracturing equipment controller, so that a single control center can simultaneously realize multiple types of control.

According to one embodiment, the first sensing device and the second sensing device comprise position sensor(s). Alternatively, the first sensing device and the second sensing device comprise 3D scanning positioning system(s).

According to one embodiment, the hose is connected to the manifold interface in a union form or a quick plug form.

In another aspect, the present disclosure provides a fracturing equipment comprising a hose quick connection device according to any of the above solutions and a hose, wherein the hose quick connection device can hold and operate the hose.

With the hose quick connection device according to the present disclosure, only one operator on site is needed to realize accurate and quick connection of the heavy high-pressure hose to the manifold skid by one touch, which conserves much human, physical and financial resources. Moreover, through this device, the fracturing hose is automatically transferred to the manifold interface with a higher safety factor.

DETAILED DESCRIPTION OF EMBODIMENTS

Figure 1:
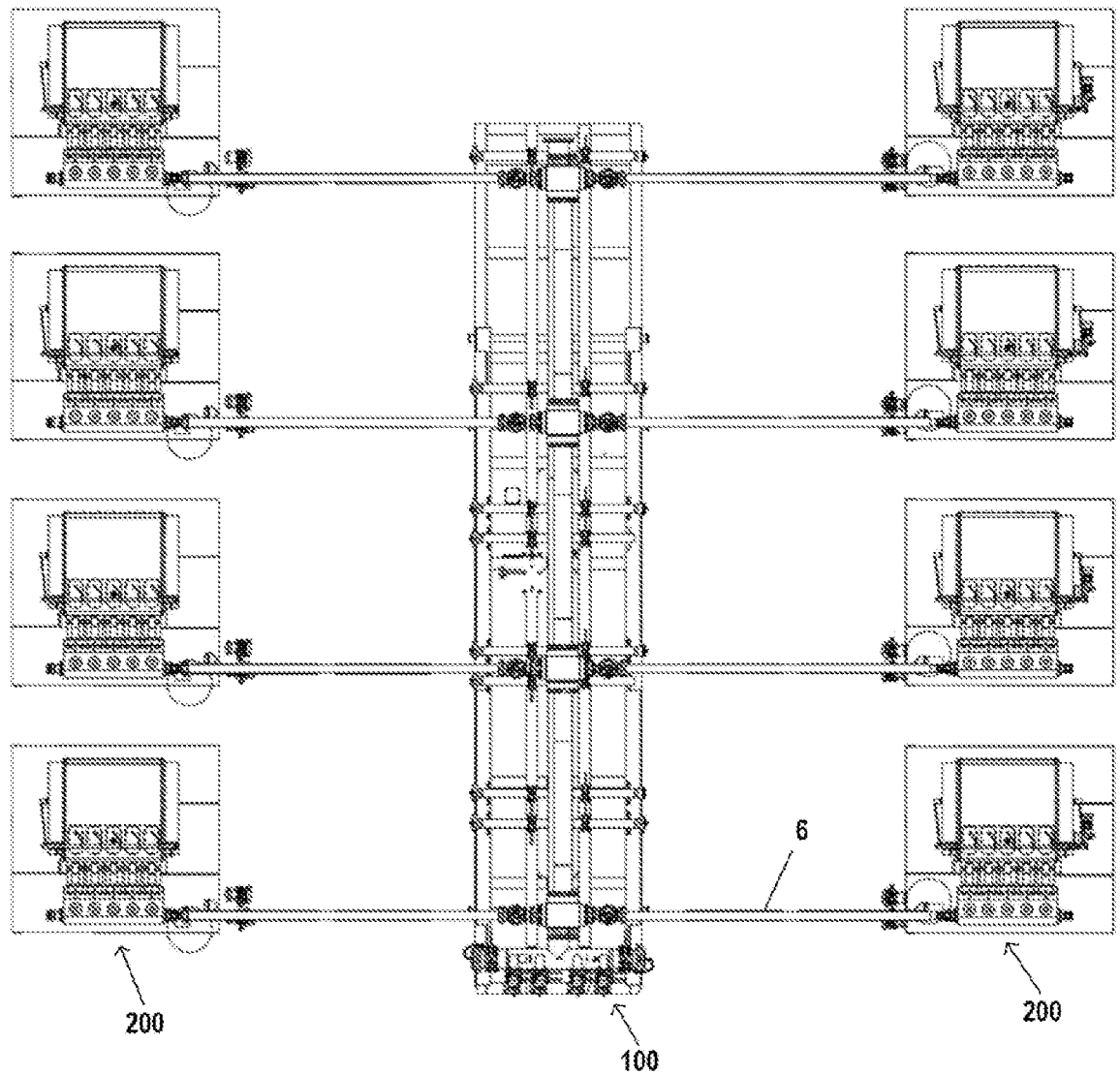
FIG. 1 shows a schematic diagram of a fracturing operation site arrangement.

FIG. 1 shows a schematic diagram of a typical fracturing operation site arrangement. As shown in FIG. 1, at the fracturing site, there is a manifold 100 with a plurality of manifold interfaces 16 to receive fracturing fluid, and the manifold 100 may be disposed on a skid to form a manifold skid. Fracturing equipment 200 such as a fracturing truck is connected with the interface of the manifold 100 through a hose 6 to deliver the fracturing fluid from the fracturing equipment 200 to the manifold 100, and then to deliver the same downhole through the manifold for fracturing operations. Although FIG. 1 shows that there are 8 fracturing trucks 200 connected to the manifold, more or fewer fracturing equipment may be connected according to demand. Upon preparation for the fracturing operation, after the fracturing equipment 200 arrives at the fracturing site, the fracturing equipment 200 needs to be connected to the manifold 100 through the hose. The present disclosure is to provide a quick connection device for realizing such an operation.

Figure 2:
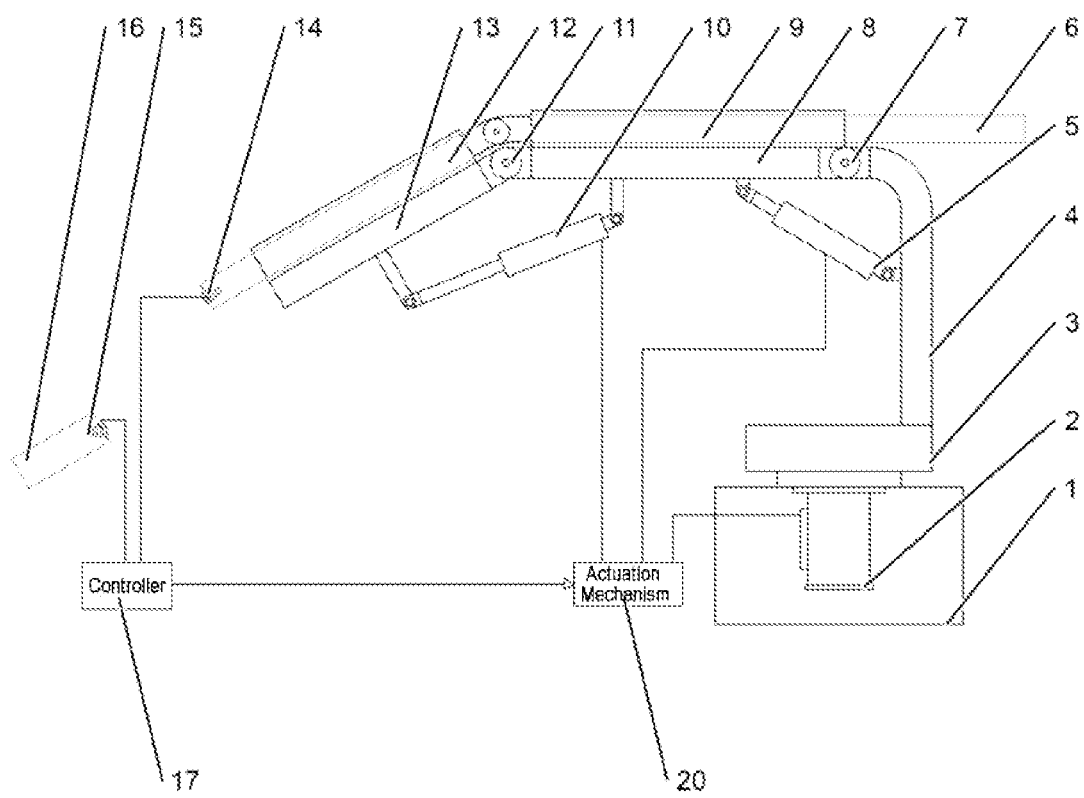
FIG. 2 shows a schematic diagram of a hose quick connection device according to an embodiment of the present disclosure, wherein the hose is located at an initial position.

FIG. 2 shows a hose quick connection device 300 for fracturing equipment. To deliver the fracturing fluid, one end of the high-pressure hose 6 may be fixedly or releasably connected to the fracturing equipment in advance. The hose quick connection device 300 according to the present disclosure realizes automatic quick connection of the free end of the hose and the manifold interface 16.

The hose quick connection device 300 shown in FIG. 2 includes a hose holding and moving mechanism, a controller 17 and an actuation mechanism 20. The hose holding and moving mechanism can hold the hose 6 and move the free end of the hose 6 from an initial position to a target position aligned with the manifold interface 16. For example, FIG. 2 shows an initial position in which the fracturing equipment is initially positioned relative to the manifold after the fracturing truck arrives at the site, wherein the free end of the hose 6 is not aligned with the manifold interface 16.

In the illustrated embodiment, the hose holding and moving mechanism includes a base 1 preferably arranged on the fracturing equipment, a fixed rod 4 extending vertically upward from the base 1 and horizontally rotatable, a first arm 8 pivotally connected to the fixed rod 4 around a joint 7, and a second arm 13 pivotally connected to the first arm 8 around a joint 11. The hose 6 is releasably held to the first arm 8 and the second arm 13 by the hose holding members 9 and 12, respectively. In one embodiment, the hose holding members 9 and 12 may be in the form of hose clamps. Other structures capable of releasably holding the hose to the first arm 8 and the second arm 13 are also conceivable, such as sleeves. A hydraulic motor 2 is disposed in the base 1 to drive the fixed rod 4 to rotate horizontally by driving a rotating base 3. A hydraulic cylinder 5 is disposed between the fixed rod 4 and the first arm 8. One end of the hydraulic cylinder 5 is connected to the side of the fixed rod 4 while the opposite end is connected to the side of the first arm 8. A hydraulic cylinder 10 is provided between the first arm 8 and the second arm 13. One end of the hydraulic cylinder 10 is connected to the side of the first arm 8 while the opposite end is connected to the side of the second arm 13. The expansion and contraction of the hydraulic cylinders 5 and 10 may drive the first arm 8 and the second arm 13 to pivot around the joints 7 and 11.

Figure 3:
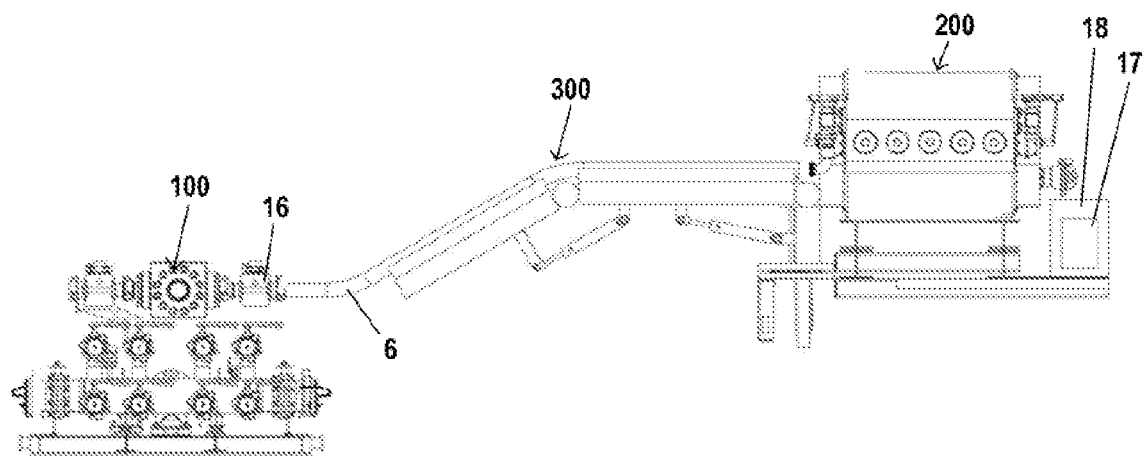
FIG. 3 shows another schematic diagram of the hose quick connection device shown in FIG. 2, wherein the hose is located at a target position and connected to a manifold interface.

The controller 17 may communicate with a first sensing device 15 provided on the manifold interface 16 to receive orientation information indicating the orientation of the manifold interface from the first sensing device 15. The controller 17 may communicate with a second sensing device 14 provided on the free end of the hose 6 to receive orientation information indicating the orientation of the free end of the hose from the second sensing device 14. In addition, the controller 17 may compare the orientation information of the manifold interface and the free end of the hose and calculate a desired motion command for moving the free end of the hose to the target position aligned with the manifold interface. Then, the controller 17 sends the desired motion command to the actuation mechanism 20. In response, the actuation mechanism 20 actuates the hose holding and moving mechanism to move the free end of the hose 6 to the target position. The controller 17 may be a processor and preferably integrated in a fracturing equipment controller 18 of the fracturing equipment, as shown in FIG. 3. The first sensing device 15 and the second sensing device 14 may be various forms of position sensors, such as laser sensors, smart sensors, and the like. Alternatively, the first sensing device 15 and the second sensing device 14 may each be a 3D scanning positioning system to form point cloud data by scanning the surface contour of the manifold interface, thereby obtaining the spatial coordinates of the current interface.

In the illustrated embodiment, the actuation mechanism 20 is a hydraulic mechanism, which, in response to the desired motion command from the controller 17, delivers hydraulic oil to the hydraulic motor 2, the hydraulic cylinder 5 and the hydraulic cylinder 10 to enable the hose holding and moving mechanism to operate the hose 6. Specifically, the hydraulic motor 2 drives the fixed rod 4 to rotate horizontally by driving the rotating base 3. The expansion and contraction of the hydraulic cylinders 5 and 10 may drive the first arm 8 and the second arm 13 to pivot around the joints 7 and 11, thereby changing the positioning and orientation of the free end of the hose 6 so that the free end of the hose 6 may move up, down, left, and right to any position within a certain range, and finally to the target position aligned with the manifold interface 16.

The operation process of the hose quick connection device is described below.

As mentioned above, the base 1 of the hose quick connection device is mounted on the fracturing equipment, and the hose 6 is connected with the fracturing equipment to deliver the fracturing fluid. The fracturing equipment arrives at the operation site and is positioned close to the manifold skid so that the free end of the hose 6 can reach the manifold interface 16 within its maximum range of movement. By operating the controller 17, for example, by a user inputting an instruction, the first sensing device 15 on the manifold interface 16 and the second sensing device 14 on the free end of the high-pressure hose 6 respectively send the orientation information, e.g., coordinate information of the manifold interface 16 and the free end of the hose 6 to the controller 17. The controller 17 calculates a desired motion command for moving the free end of the hose 6 to the target position aligned with the manifold interface based on the received orientation information of the manifold interface 16 and the free end of the hose 6. Then, the controller 17 sends the desired motion command to the actuation mechanism 20, and the actuation mechanism 20 delivers hydraulic oil to the hydraulic motor 2, the hydraulic cylinder 5 and the hydraulic cylinder 10 according to the desired motion command, so that the fixed rod 4 and the first arm 8 and the second arm 13 moves the free end of the hose 6 toward the manifold interface as desired.

For example, the actuation mechanism 20 may supply oil to the hydraulic motor 2 in response to the desired motion command from the controller 17 to drive the fixed rod 4 to rotate horizontally. According to the desired motion command, after the fixed rod 4 is rotated to a certain angle as needed, the hydraulic motor 2 will automatically stop rotating. While stopping the rotation, the controller 17 may control the actuation mechanism 20 to supply oil to the hydraulic cylinder 5 to make the hydraulic cylinder 5 expand or contract, so as to drive the first arm 8 to pivot around the joint 7, thereby driving the hose holding member 9, the hose holding member 12, the second arm 13 and the hose 6 to pivot vertically around the joint 7. According to the requirements of the desired motion command, the actuation mechanism 20 is controlled to supply oil to the hydraulic cylinder 10 to control the expansion and contraction thereof, thereby driving the second arm 13 and the hose 6 to pivot vertically around the joint 11. Through this series of actions, the free end of the hose 6 may be full-automatically moved to align with the manifold interface 16, as shown in FIG. 3, thereby achieving the alignment and connection with the manifold interface without requiring workers to manually lift and pull the hose of over 100 kilograms.

Once the high-pressure hose 6 is aligned with the manifold interface 16, the high-pressure hose 6 may be connected to the manifold interface 16. The high-pressure hose 6 may be connected to the manifold interface 16 in a union form, a quick-plug form or other available forms.

Although individual operations of the hydraulic motor 2, the hydraulic cylinder 5 and the hydraulic cylinder 10 are specifically described above, it is apparent for those skilled in the art that the operations may be parallel, or actuated separately or simultaneously. The actuation mechanism 20 may include separate hydraulic circuits that control the hydraulic motor 2, the hydraulic cylinder 5 and the hydraulic cylinder 10, respectively.

The present disclosure is described above in conjunction with the hydraulic actuation mechanism, but those skilled in the art may appreciate that the actuation mechanism of the present disclosure is not limited to the hydraulic mechanism, and may also be an electric actuation mechanism or a combination of the electrical actuation mechanism with the hydraulic actuation mechanism. For example, the hydraulic actuator i.e., the hydraulic motor 2 may be replaced with an electric motor, the hydraulic cylinder 5 and the hydraulic cylinder 10 may be removed, and a servo motor is instead installed at the joint 7 and the joint 11.

As such, various embodiments have been shown and described. Certainly, various changes and substitutions may be made without departing from the spirit and scope of the present disclosure. Therefore, in addition to the appended claims and their equivalent scope, the disclosure is not subject to other restrictions.

We claim:

1. A hose quick connection device for fracturing equipment, comprising:
    a hose holding and moving mechanism for holding a hose and moving the hose between an initial position and a target position, wherein the initial position is a position in which the fracturing equipment is initially positioned with respect to a manifold, and the target position is a position in which a free end of the hose is aligned with a manifold interface;
    a first sensing device disposed on the free end of the hose;
    a second sensing device disposed at the manifold interface; and
    a controller configured to:
    receive first orientation information indicating the orientation of the free end of the hose from the first sensing device and second orientation information indicating the orientation of the manifold interface from the second sensing device;
    generate a desired motion command for moving the free end of the hose to the target position, based on the first orientation information and second orientation information; and
    control the hose holding and moving mechanism to execute the desired motion command to move the free end of the hose to the target position.

2. The hose quick connection device according to claim 1, wherein the controller is configured to transmit the desired motion command to an actuation mechanism which is configured to control the hose holding and moving mechanism to move the free end of the hose to the target position based on the desired motion command.

3. The hose quick connection device according to claim 2, wherein the hose holding and moving mechanism comprises:
    a base;
    a fixed rod extending from the base and configured to rotate relative to the base;
    a first arm pivotally connected to the fixed rod; and
    a second arm pivotally connected to the first arm,
    wherein the hose is releasably held on the first arm and the second arm.

4. The hose quick connection device according to claim 3, wherein the actuation mechanism is a hydraulic mechanism, comprising a hydraulic motor disposed in the base, a first hydraulic cylinder disposed between the fixed rod and the first arm, and a second hydraulic cylinder disposed between the first arm and the second arm.

5. The hose quick connection device according to claim 3, wherein the actuation mechanism is an electric mechanism, comprising an electric motor disposed in the base, a first servo motor disposed between the fixed rod and the first arm, and a second servo motor disposed between the first arm and the second arm.

6. The hose quick connection device according to claim 3, wherein the base is disposed on the fracturing equipment.

7. The hose quick connection device according to claim 3, wherein the hose is releasably held on the first arm and second arm via a hose clamp or a sleeve.

8. The hose quick connection device according to claim 1, wherein an opposite end of the hose is fixedly or releasably connected to the fracturing equipment to receive a fracturing fluid.

9. The hose quick connection device according to claim 1, wherein the fracturing equipment has a fracturing equipment controller, and the controller is integrated into the fracturing equipment controller.

10. The hose quick connection device according to claim 1, wherein the first sensing device and the second sensing device comprise a position sensor.

11. The hose quick connection device according to claim 1, wherein the first sensing device and the second sensing device comprise a 3D scanning positioning system.

12. The hose quick connection device according to claim 1, wherein the hose is connected to the manifold interface in a union form or a quick-plug form.

13. Fracturing equipment, comprising a hose quick connection device according to claim 1 and a hose, wherein the hose quick connection device is configured to hold and operate the hose.

\* \* \* \* \*